United States Patent [19]

Ryan

[11] 4,145,491

[45] Mar. 20, 1979

[54] CHLORINATION OR CHLOROSULFONATION OF POLYETHYLENE IN MIXED SOLVENT

[75] Inventor: Donald J. Ryan, Beaumont, Tex.

[73] Assignee: E. I. Du Pont de Nemours and Company, Wilmington, Del.

[21] Appl. No.: 805,151

[22] Filed: Jun. 9, 1977

[51] Int. Cl.² .......................... C08F 8/38; C08F 8/36
[52] U.S. Cl. ........................................ 526/31; 526/22; 526/41
[58] Field of Search ...................... 526/41; 260/79.3 R

[56] References Cited

U.S. PATENT DOCUMENTS

| | | | |
|---|---|---|---|
| 2,964,509 | 12/1960 | Hurt | 526/43 |
| 2,981,720 | 4/1961 | Herzberg | 260/79.3 R |
| 3,252,921 | 5/1966 | Hansen | 260/79.3 R |
| 3,296,222 | 1/1967 | Dixon | 260/79.3 R |
| 3,299,014 | 1/1967 | Kalil | 260/79.3 R |
| 3,314,925 | 4/1967 | King | 260/79.3 R |
| 3,347,835 | 10/1967 | Lorenz | 260/79.3 R |
| 3,542,747 | 11/1970 | Ennis | 526/41 X |
| 3,960,821 | 1/1976 | Vogt | 260/79.3 R |

Primary Examiner—C. A. Henderson

[57] ABSTRACT

A process for chlorinating or chlorosulfonating polyethylene comprising dissolving polyethylene in a solvent that is a mixture of methylene chloride and trichlorofluoromethane in a weight ratio of 0.3–1.6, reacting the resultant solution with sulfuryl chloride under pressure to maintain reactants, the resulting chlorinated or chlorosulfonated polyethylene and product gases in a single liquid phase, reducing the pressure on or increasing the temperature of the single liquid phase of chlorinated or chlorosulfonated polyethylene and solvent to form two liquid phases, one a polymer-rich phase and the other a solvent-rich phase, and separating the phases.

10 Claims, 1 Drawing Figure

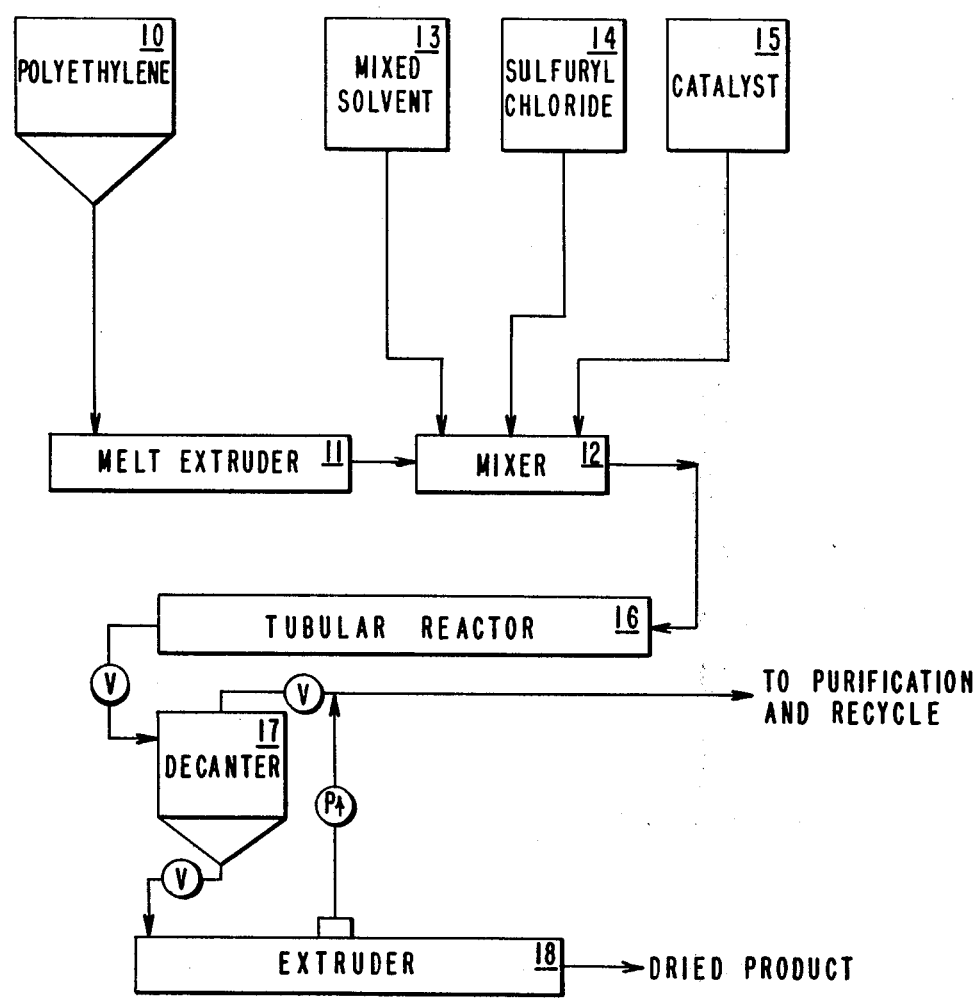

CHLORINATION OR CHLOROSULFONATION OF POLYETHYLENE IN MIXED SOLVENT

BACKGROUND OF THE INVENTION

This invention relates to a process for chlorinating or chlorosulfonating polyethylene utilizing sulfuryl chloride and a particular solvent.

Valuable products can be made by chlorinating or chlorosulfonating polyethylene. It is known that chlorosulfonated solid polymers of ethylene, which contain 25 percent to 40 percent chlorine and 0.4 to 3 percent sulfur, can be cured to form elastic products which have exceptional resistance to attack by oxygen, ozone and corrosive chemicals. Valuable products are also made by chlorinating polyethylene with sulfuryl chloride and cross-linking the polymer with peroxides or other free radical sources. Generally, the chlorosulfonated polymers are manufactured commercially by simultaneously chlorinating polyethylene to replace hydrogen by chlorine and reacting the chlorinated polyethylene with a mixture of chlorine and sulfur dioxide to introduce chlorosulfonic groups into the chlorinated polymer. These procedures are described in detail in U.S. Pat. Nos. 2,586,363 and 3,296,222.

When polyethylene is chlorinated or chlorosulfonated to produce the resulting elastomeric polyolefin the distribution of the chlorine atoms on the polyethylene has a most substantial effect on the elastomeric properties of the resulting chlorinated polyolefin. The effect of chlorinating is to convert the crystalline polyethylene to an amorphous chlorinated polyethylene, and the more even the distribution of the chlorine atoms on the polymer the more efficient the conversion from a crystalline to an amorphous polymer. In order to obtain evenness of distribution of chlorine on polyethylene, the chlorination or chlorosulfonation of the polyethylene with sulfuryl chloride is conducted in a single phase in solution as described in U.S. Pat. No. 3,299,014. However, when such procedure is used a problem arises because it is difficult and expensive to remove the solvent from the chlorinated polyolefin. Solvents suitable for use in commercial processes to dissolve both polyethylene and chlorinated product are not volatile enough to be vaporized by the heat of reaction. Accordingly, it has been necessary to heat the mixture of solvent and chlorinated product to remove solvent from the polymer. The separation procedure is slow and expensive. When more volatile solvents are used the chlorinated polyethylene forms a separate phase in the reactor before chlorination is complete, thus leading to uneven distribution of chlorine atoms on the polyethylene. There has been a need for a procedure for making chlorinated polyethylene with sulfuryl chloride by which one can obtain not only an even distribution of chlorine atoms on the polyethylene but also a process in which the chlorinated polyethylene can be easily and readily separated from solvent. The present invention provides such a continuous process for making chlorinated or chlorosulfonated polyethylene.

SUMMARY OF THE INVENTION

The present invention is directed to an improvement in a continuous process for chlorinating or chlorosulfonating polyethylene by dissolving polyethylene in a solvent and reacting the resultant solution with sulfuryl chloride at a temperature and under sufficient pressure to maintain reactants, the resulting chlorinated or chlorosulfonated polyethylene and product gases in a single liquid phase, the improvement comprising using as the solvent a mixture of methylene chloride and trichlorofluorormethane in a weight ratio of 0.3–1.6, and reducing the pressure or increasing the temperature of the single liquid phase to form two liquid phases, one a polymer-rich phase and the other a solvent-rich phase, and separating the phases.

DESCRIPTION OF PREFERRED EMBODIMENTS

Any polyethylene can be utilized in the process of this invention, such as linear, high density polyethylene or low density, branched-chain polyethylene. The polyethylene, preferably, has a sufficiently high molecular weight, e.g., at least about 10,000 wt. avg., generally 80,000, to yield an elastomeric material having high tensile strength upon chlorination or chlorosulfonation. The term "polyethylene" is also intended to include polymers of ethylene containing minor amounts, i.e., up to 10 weight percent, of other ethylenically unsaturated monomers copolymerizable therewith, especially other lower alkenes such as propylene or butene-1, or other monomers such as acrylic or methacrylic acids.

The polyethylene is melted and then dissolved at a temperature of from 90°–125° C. in a solvent mixture of methylene chloride-trichlorofluoromethane. The concentration of polyethylene in the solution usually ranges from about 2–20 weight percent. The weight ratio of methylene chloride to trichlorofluoromethane in the solvent mixture is within a range of about 0.3–1.6, preferably 0.7–1.2. The choice of a particular ratio depends on the desired degree of chlorination (% Cl in the product) and the final reaction temperature and is made so that the reactor contents remain single phase but two phases are produced when the pressure is reduced or the temperature increased as the solution passes to a vessel for separation, e.g., a decanter. An increase in the ratio of methylene chloride to trichlorofluoromethane is usually required when the degree of chlorination or the reactor temperature are increased, although small changes in these variables can be compensated by increased reactor pressure.

Sulfuryl chloride is used in both the chlorosulfonation and the chlorination of polyethylene. The process utilizes about the stoichiometric amount of chlorine in sulfuryl chloride so that the amount introduced corresponds to the desired amount of chlorination. Generally, about 77–385 parts of sulfuryl chloride is added for each 100 parts by weight of polyethylene. The attachment of chlorine atoms along the polyethylene molecule in place of hydrogen atoms originally present takes place in both instances and thus effects chlorination. Chlorosulfonation occurs when there is attachment of a —$SO_2Cl$ radical to the polyethylene molecule in significant amounts in addition to the substitution of chlorine atoms. Chlorosulfonated polyethylene usually contains from about 0.1–4, preferably 0.7–1.5, weight percent sulfur and from about 15–60, preferably 25–45, weight percent chlorine; however, higher or lower amounts can be present. Chlorinated polyethylene usually contains 25–50 weight percent chlorine.

The reaction between polyethylene in solution in methylene chloride and trichlorofluoromethane and sulfuryl chloride takes place in an elongated reaction zone, generally, a tubular reactor. The solution of polyethylene, sulfuryl chloride and solvent mixture of methylene chloride and trichlorofluoromethane passes through the reactor under viscous laminar flow and is under pressure sufficient to maintain the reactants, the resultant chlorinated polyolefin, and product gases in a single phase in the solvent. Any pressure range that accomplishes this result is suitable and the upper value is limited only by apparatus restrictions. Generally, pressures of the order of from about 4.5 MPa–21 MPa, usually 7–17 MPa, are used. The temperature at the beginning of the reactor is at least sufficient to dissolve the polyethylene, usually at least about 90° C., and as the reaction proceeds the temperature can increase up to the point where polymer degradation begins, usually not more than about 190° C. It is important to maintain the mixture in the tubular reactor in a single liquid phase so as to obtain an even distribution of the chlorine atoms on the polyethylene molecule. Such even distribution of the chlorine atoms on the polyethylene lessens the crystallinity of the chlorinated polyolefin, imparts elastomeric properties to the polyolefin, and improves durability of the product in many applications. The mixture flows through the tubular reactor with little or no mixing of more rapidly flowing portions of the mixture at or near the center of the tube with the more slowly flowing portions at or near the wall of the tube.

Optionally, and preferably, a conventional free radical initiator for chlorination or chlorosulfonation of the polyethylene is present during the reaction thus aiding in the production of active sites on the polyethylene molecule. Typical of such free radical initiators are azobis(cyanoalkanes) such as α,α-azobisisobutyronitrile, azodicyclohexenecarbonitrile, and 2,(2'-hydroxyethylazo)-2,4-dimethylvaleronitrile, organic peroxides such as lauroyl peroxide or ditertiarybutyl peroxide, and other free radical initiators such as described in U.S. Pat. Nos. 2,503,252 and 2,640,048.

Chlorosulfonation is enhanced when a conventional chlorosulfonation catalyst is present during the reaction with polyethylene. Suitable catalysts include tertiary amines, e.g., pyridine, quinoline, quinaldine, nicotine, piperidine, dimethylaniline, tributylamine, and others described in U.S. Pat. No. 2,383,319, and sulfhydryl compounds such as 2-mercaptothiazoline and allyl thiourea, and amides such as dimethyl formamide or acetamide.

The single-phase liquid mixture of chlorinated polyolefin and solvent flows from the reactor to a phase decanter for separation of the chlorinated or chlorosulfonated polyethylene from the solvent. Separation of the chlorinated or chlorosulfonated polyethylene and solvent is accomplished by reducing the pressure or increasing the temperature on the single phase material until two phases separate. One phase, the upper lighter material, is the solvent-rich phase, whereas the lower phase heavier material is the polymer-rich phase. Phase separation occurs when the pressure is reduced, generally, from 3–15 MPa, below the reactor pressure. There is no need to regulate the temperature of the material and it remains about the same during phase separation as it was leaving the reactor, i.e., about 130°–180° C., usually 140°–170° C. Alternatively, one obtains two liquid phases if the temperature of the single liquid phase solution is increased. For example, if the temperature of the solution leaving the reactor is increased at least about 10°–20° C. in the decanter, two separate liquid phases form and can be separated. The upper temperature value is limited only by the decomposition temperature of the product. Since this procedure requires energy input, it is less desirable. In any event, by regulating pressure or temperature in the decanter one can achieve phase separation and the formation of a polymer-rich phase and a solvent-rich phase. The particular solvent mixture used in the process allows phase decantation, provides low solution viscosities, high volatility and high diffusion rates, all of which are essential to an economical process for making chlorinated polyethylene.

The polymer-rich phase is readily separated from the solvent rich phase in the settling chamber of the decanter by the action of gravity. The solvent-rich phase is removed overhead and can be recirculated after by-product gases are removed. The polymer-rich phase flows to a devolatizing extruder maintained at subatmospheric pressure for further removal of traces of solvent.

The invention may be more clearly understood by reference to the accompanying drawing, which illustrates diagramatically equipment adapted for carrying out this invention.

Solid polyethylene in particulate form is supplied from hopper 10 to melt extruder 11 where the polyethylene is pumped and heated to a temperature, usually about from 100°–180° C., to form a molten mass. The resultant liquid polyethylene then flows to mixer 12. Simultaneously, a solvent mixture of methylene chloride and trichlorofluoromethane in a weight ratio of about 0.3–1.6 is introduced from solvent supply vessel 13 to mixer 12. At the same time sulfuryl chloride is introduced from supply vessel 14 to mixer 12. A free radical initiator, and if the polyethylene is to be chlorosulfonated, a conventional chlorosulfonating catalyst, e.g., a tertiary amine, are introduced from storage vessel 15 to mixer 12. All the ingredients are intimately mixed in mixer 12 to dissolve the polyethylene and the reactants in the solvent, and form a solution which has a temperature of about 90°–125° C. Adequate mixing is accomplished in about 1 to 10 seconds at which time the ingredients are passed to tubular reactor 16 and, due to the fact that the chlorination or chlorosulfonation reaction is exothermic, exits from tubular reactor 16 at a temperature of the order of 140°–180° C. Pressure and temperature are maintained in tubular reactor 16 to keep the reaction mixture in a single phase. Thus, polyethylene and resulting chlorinated polyolefin together with other reactants, such as catalysts, free radical initiator, and product gases, remain dissolved in the solvent. Pressures of about at least 4.5 MPa are generally used; the maximum amount of pressure that can be employed is limited only by apparatus restrictions. Usually, from a practical standpoint, the maximum pressure is not greater than about 21 MPa. It is important to the successful operation of this invention that the reaction in which the chlorinated polyolefin is made is conducted in a single liquid phase. This is necessary in order to obtain a homogeneous product that exhibits improved durability in use as well as elastomeric properties which are due primarily to evenness of distribution of the chlorine atoms in the polyethylene molecule.

The single phase reaction mixture that contains, primarily, chlorinated polyolefin and solvent is passed through a pressure regulator to phase decanter 17 where formation and separation of the solvent-rich phase from the polymer-rich phase takes place as a result of the reduction in pressure. Generally, such conditions require pressure reductions of from about 3–15 MPa below the reactor pressure or, alternatively, an increase in the temperature of the single liquid phase by at least about 10°-20° C. above the reactor temperature.

The polymer-rich phase from phase decanter 17 is drawn off by gravity flow and passed to devolatilizing extruder 18 where the remaining solvents, HCl and SO$_2$, are removed at subatmospheric pressures and the dried chlorinated polyolefin product is recovered.

Solvent and SO$_2$ from the phase decanter and devolatilizing extruder can be recovered by distillation, as described, for example, in Kalil, U.S. Pat. No. 3,299,014, and reused in the process.

The following examples are presented as illustrative of the process of the invention.

EXAMPLE I

A solution of polyethylene in a mixed solvent is prepared by continuously mixing 30 g/min. molten polyethylene at a temperature of 160° C. with a mixture of 200 g/min. of trichlorofluoromethane solvent and 105 g/min. of methylene chloride solvent. To this solution is added 66 g/min. of a solution of 0.5 g azobisisobutyronitrile and 1 cm$^3$ of pyridine per liter of methylene chloride and subsequently 64 g/min. of sulfuryl chloride. The resulting solution, containing 0.85 g of methylene chloride per gram of trichlorofluoromethane at a temperature of about 105° C., is fed to the bottom of a 5 cm diameter × 120 cm long cylindrical reactor (vol. = 2400 cm$^3$) where during the average residence time of 6 min. the chlorosulfonation reaction takes place and the heat of reaction raises the temperature of the solution to about 150° C. Pressure in the reactor is maintained at 7.5 MPa by a control valve at the exit; thus the reactants, chlorinated polyethylene and product gases are a single liquid phase. The solution coming from the reactor is conducted to a decanter which is a pressure vessel maintained at a pressure of about 2.8 MPa and a temperature of 148° C. where it separates into a solvent-rich phase containing less than 2 wt. % polymer and polymer-rich phase containing about 35 wt. % polymer. The polymer-rich phase is separated by gravity flow and is passed into a devolatilizing extruder where the remaining product gases are removed. Chlorosulfonated polyethylene containing 34 wt. % Cl and 1 wt. % sulfur is recovered at a rate of 46 g/min.

EXAMPLE II

To produce a chlorinated polyethylene with a minimum number of sulfuryl chloride side groups, the procedure described above in Example I is repeated except that the pyridine is omitted. Infrared analysis of the chlorinated polyethylene indicates that the polymer contains 34 wt. % Cl and less than 0.02 wt. % sulfur.

EXAMPLE III

The procedure described in Example I is repeated except that the temperature of the material entering the chlorosulfonation reactor is adjusted to 120° C.; the heat of reaction increases the temperature of the solution to about 163° C. 15 MPa pressure in the reactor is required to maintain a single liquid phase in the reactor. Phase separation is achieved by reducing the pressure to 3 MPa in the decanter. The temperature remains at about 160° C. and a solvent-rich phase is removed overhead. The heavier polymer-rich phase is drawn off the bottom of the separator.

I claim:

1. In a continuous process for chlorinating or chlorosulfonating polyethylene which comprises dissolving polyethylene in a solvent and reacting the resultant solution with sulfuryl chloride at a temperature and under sufficient pressure to maintain reactants, the resulting chlorinated or chlorosulfonated polyethylene and product gases in a single liquid phase, the improvement comprising using as the solvent a mixture of methylene chloride and trichlorofluoromethane in a weight ratio of 0.3–1.6, and reducing the pressure on the single liquid phase about 3–15 MPa below the reactor pressure or increasing the temperature on the single liquid phase at least about 10°–20° C. above the reactor temperature to form two liquid phases, one a polymer-rich phase and the other a solvent-rich phase, and separating the phases.

2. A process of claim 1 wherein pressure on the single liquid phase is reduced to form two liquid phases.

3. A process of claim 1 wherein a chlorosulfonating catalyst is added to the polyethylene.

4. A process of claim 1 wherein a free radical initiator is added to the polyethylene.

5. A process of claim 1 wherein the weight ratio of methylene chloride to trichlorofluoromethane is from about 0.7–1.2.

6. A process of claim 2 wherein temperature during formation of the two liquid phases is between about 130°–180° C.

7. A process of claim 2 wherein pressure during reaction of polyethylene with sulfuryl chloride is from about 4.5–21 MPa.

8. A process of claim 2 wherein the weight ratio of methylene chloride to trichlorofluoromethane is from about 0.7–1.2.

9. A process of claim 8 wherein the polymer-rich phase is separated by gravity flow.

10. A process of claim 8 wherein a free radical initiator and chlorosulfonating catalyst are added to the polyethylene.

* * * * *